United States Patent
Suzuki et al.

[11] Patent Number: 6,090,447
[45] Date of Patent: *Jul. 18, 2000

[54] PROCESS FOR FORMING A WATER-REPELLENT THIN FILM

[75] Inventors: Yoshitada Suzuki, Aichi; Takashige Yoneda, Yokohama, both of Japan

[73] Assignee: Asahi Glass Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/907,093

[22] Filed: Aug. 6, 1997

[30] Foreign Application Priority Data

Aug. 9, 1996 [JP] Japan ................................. 8-211401

[51] Int. Cl.[7] ................................................ B05D 3/10
[52] U.S. Cl. ...................... 427/336; 427/337; 427/355; 134/40
[58] Field of Search ........................ 427/336, 337, 427/353, 355, 358, 368, 429; 134/7, 38, 40; 430/327, 331

[56] References Cited

U.S. PATENT DOCUMENTS

| 3,524,760 | 8/1970 | Pinkerton | 117/63 |
|---|---|---|---|
| 4,175,139 | 11/1979 | Kijima et al. | 424/343 |
| 4,357,370 | 11/1982 | Alheid | 427/211 |
| 4,659,494 | 4/1987 | Soldanski et al. | 252/88 |
| 5,068,132 | 11/1991 | Brunken et al. | 427/421 |
| 5,091,483 | 2/1992 | Mazurek et al. | 525/477 |
| 5,319,049 | 6/1994 | Yoshioka et al. | 528/10 |
| 5,378,521 | 1/1995 | Ogawa et al. | 428/85 |
| 5,389,427 | 2/1995 | Berquier | 428/210 |
| 5,869,136 | 2/1999 | Ohtake et al. | 427/255.7 |

FOREIGN PATENT DOCUMENTS

| 0 492 417 | 7/1992 | European Pat. Off. . |
|---|---|---|
| 492417 | 7/1992 | European Pat. Off. . |
| 0 498 335 | 8/1992 | European Pat. Off. . |
| 0 577 951 | 1/1994 | European Pat. Off. . |
| 577951 | 1/1994 | European Pat. Off. . |
| 34 18 163 | 11/1985 | Germany . |
| 63-2963 | 10/1989 | Japan . |

*Primary Examiner*—Shrive Beck
*Assistant Examiner*—Michael Barr
*Attorney, Agent, or Firm*—Oblon, Spivak, McClelland, Maier & Neustadt, P.C.

[57] ABSTRACT

A process for forming a water-repellent thin film on a substrate surface by means of a coating fluid for forming a water-repellent thin film, which comprises a coating step of excessively coating the coating fluid for forming a water-repellent thin film on the substrate surface, and an excess amount-removing step of subsequently removing the excess amount of the coating fluid for forming a water-repellent thin film.

2 Claims, 3 Drawing Sheets

← Coating direction

PROCESS FOR FORMING A WATER-REPELLENT THIN FILM

The present invention relates to a process for forming a water-repellent thin film by coating a coating fluid for forming a water-repellent thin film on a substrate surface such as a glass surface.

Heretofore, a process for forming a water-repellent thin film has been such that a coating fluid for forming a water-repellent thin film is put on paper or the like, and the coating fluid is spread on a substrate and wiped until a transparent state free from any problem on appearance has been attained while replacing the paper or the like.

This process is acceptable for a small quantity and for a small area, but requires substantial time and labor for a large quantity and for a large area. Besides, there has been non-uniformity in the coating degree (e.g. in the amount, strength or time). Consequently, there has been non-uniformity on appearance or inconsistency in the performance, and thus this process was not suitable for mass production. Further, it has been difficult to mechanize the process, since it is required to frequently replace during the process the paper or the like on which the coating fluid for forming a water-repellent thin film is put.

Namely, such a conventional process has the following three problems as the main problems.

1) The coating fluid for forming a water-repellent thin film is put on paper or the like and then coated on a substrate surface. Accordingly, it is difficult to uniformly control the amount of the fluid, the coating time, the number of coating operations, the pressing force (the coating force), etc., and to automate the process, and due to manual operation, there will be inconsistency in the contact angle (the contact angle of water to the substrate). Consequently, the process is not suitable for treatment of a large quantity.

2) If the evaporation efficiency of the coating fluid for forming a water-repellent thin film is improved, treatment can be carried out in a short period of time, but the area to be treated will be small, and to treat a large area, it will be necessary to combine treatments of such small area units. If the evaporation efficiency is decreased, a large area can be treated at once, but on the other hand, there have been drawbacks such that substantial time is required until finishing, the coating fluid tends to be stretched too thin or wiped off so much that the film thickness will be thin, and the performance tends to be inadequate.

3) When mechanization is considered to overcome the above drawbacks, mechanization by e.g. a robot will be difficult as the specification therefor will be complex, since it is required to change the paper or the like during the coating. If the same material is used without changing the paper or the like, the finishing time will gradually be prolonged, and the old coating fluid for forming a water-repellent thin film will be accumulated, whereby the performance tends to be poor.

SUMMARY OF THE INVENTION

It is an object of the present invention to provide a process for forming a water-repellent thin film, whereby a high quality water-repellent thin film can be obtained constantly in a large quantity.

The present invention provides a process for forming a water-repellent thin film on a substrate surface by means of a coating fluid for forming a water-repellent thin film, which comprises a coating step of excessively coating the coating fluid for forming a water-repellent thin film on the substrate surface, and an excess amount-removing step of subsequently removing the excess amount of the coating fluid for forming a water-repellent thin film.

BRIEF DESCRIPTION OF THE DRAWINGS

In the accompanying drawings:

FIG. 5($b$) is a side view thereof.

DETAILED DESCRIPTION OF THE PREFERRED EMBODIMENTS

Figure 1:
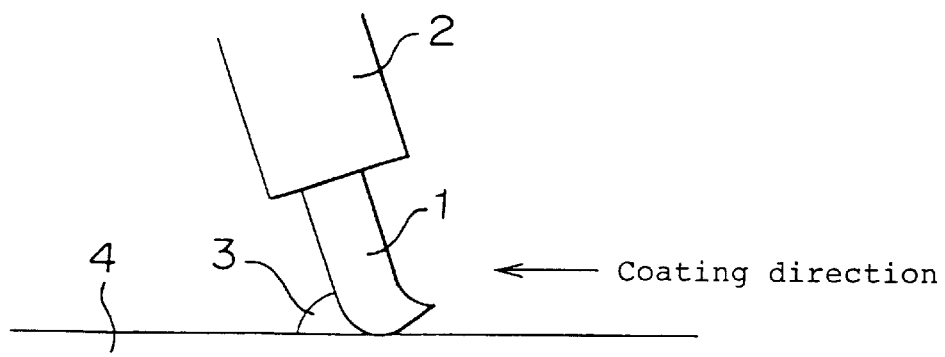
FIG. 1 is a side view showing the state of a squeegee at the time of coating a water-repellent fluid in Example 1.

Now, the present invention will be described in detail with reference to the preferred embodiments.

The present invention is characterized in that after coating a coating fluid for forming a water-repellent thin film (hereinafter referred to simply as a water-repellent fluid), "the excess amount" of the water-repellent fluid is wiped off. "The excess amount" of the water-repellent fluid (hereinafter referred to simply as the excess amount) corresponds to a portion which creates color shading or haze. Accordingly, it is important to wipe off such a portion until color shading or haze disappears.

In the present invention, a water-repellent fluid which reacts with the substrate (or with a film material in a case where the film is preliminarily formed on the substrate), is used. In the present invention, the water-repellent fluid is excessively coated on the substrate surface and reacted (such as, dried), and then the excess amount (a non-reacted portion which does not attach to the substrate surface) of the water-repellent fluid will be removed.

The substrate to be coated with the water-repellent fluid may, for example, be a substrate of glass, metal, ceramics or resin, or such a substrate having surface treatment applied thereto. Particularly preferred is glass or glass having various treatments applied thereto. Namely, it is important that the water-repellent fluid will chemically react and firmly bond with hydroxyl groups of the substrate surface, and an unreacted excess water-repellent fluid is subsequently wiped off, to form a uniform transparent water-repellent thin film (hereinafter referred to simply as a water-repellent film), and it is preferred to have active hydroxyl groups on the surface of the substrate. For example, a layer made of $SiO_2$ may be preliminarily formed on the substrate, and a water-repellent fluid may be coated on the layer made of $SiO_2$. The shape of the substrate may not necessarily be flat and may contain a curved surface shape.

The water-repellent fluid in the present invention contains a compound (an effective component) capable of forming a water-repellent film. The water-repellent fluid may be composed solely of the effective component, or may contain an organic solvent capable of dissolving or diluting the effective component, as the case requires.

The effective component may, for example, be a perfluorinated group-containing compound. The perfluorinated group-containing compound is preferably a perfluorinated group-containing silane compound. Further, such a perfluorinated group-containing compound preferably has a hydrolyzable reactive group such as —Si—OR, —Si—Cl or —Si—NCO, so that it is chemically bonded to a silanol group (—Si—OH) present at the surface of e.g. glass.

Here, the reason for using perfluorinated group-containing silane compound as the perfluorinated group-containing compound is that silanol groups present at the surface of the substrate and hydrolyzable reactive groups of the perfluorinated group-containing silane compound will chemically bond to form siloxane bonds (Si—O—Si), whereby durability of the water-repellent performance can be secured.

The perfluorinated group-containing silane compound in the present invention may, for example, be at least one compound selected from perfluorinated group-containing chlorosilanes, alkoxysilanes and isocyanate silanes. The following compounds may, for example, be mentioned as such perfluorinated group-containing silane compounds. In the following formulas, Rf represents a $C_{4-16}$ perfluoroalkyl group, Me a methyl group, Et an ethyl group, m is an integer of at least 1, and n an integer of from 4 to 16.

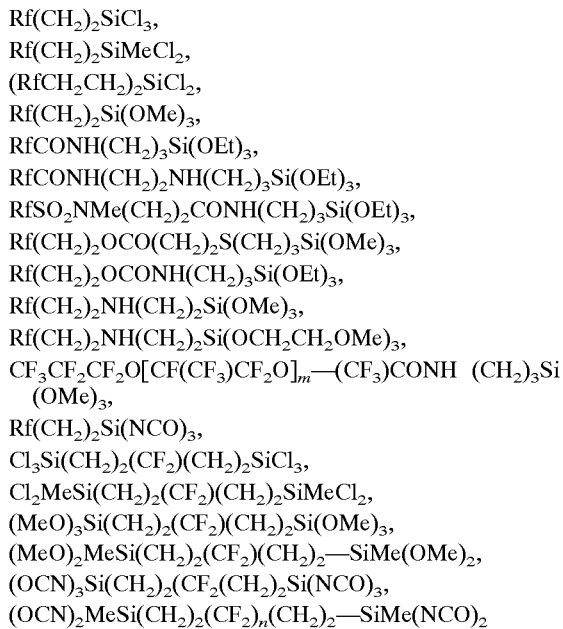

Rf(CH$_2$)$_2$SiCl$_3$,
Rf(CH$_2$)$_2$SiMeCl$_2$,
(RfCH$_2$CH$_2$)$_2$SiCl$_2$,
Rf(CH$_2$)$_2$Si(OMe)$_3$,
RfCONH(CH$_2$)$_3$Si(OEt)$_3$,
RfCONH(CH$_2$)$_2$NH(CH$_2$)$_3$Si(OEt)$_3$,
RfSO$_2$NMe(CH$_2$)$_2$CONH(CH$_2$)$_3$Si(OEt)$_3$,
Rf(CH$_2$)$_2$OCO(CH$_2$)$_2$S(CH$_2$)$_3$Si(OMe)$_3$,
Rf(CH$_2$)$_2$OCONH(CH$_2$)$_3$Si(OEt)$_3$,
Rf(CH$_2$)$_2$NH(CH$_2$)$_2$Si(OMe)$_3$,
Rf(CH$_2$)$_2$NH(CH$_2$)$_2$Si(OCH$_2$CH$_2$OMe)$_3$,
CF$_3$CF$_2$CF$_2$O[CF(CF$_3$)CF$_2$O]$_m$—(CF$_3$)CONH (CH$_2$)$_3$Si (OMe)$_3$,
Rf(CH$_2$)$_2$Si(NCO)$_3$,
Cl$_3$Si(CH$_2$)$_2$(CF$_2$)(CH$_2$)$_2$SiCl$_3$,
Cl$_2$MeSi(CH$_2$)$_2$(CF$_2$)(CH$_2$)$_2$SiMeCl$_2$,
(MeO)$_3$Si(CH$_2$)$_2$(CF$_2$)(CH$_2$)$_2$Si(OMe)$_3$,
(MeO)$_2$MeSi(CH$_2$)$_2$(CF$_2$)(CH$_2$)$_2$—SiMe(OMe)$_2$,
(OCN)$_3$Si(CH$_2$)$_2$(CF$_2$(CH$_2$)$_2$Si(NCO)$_3$,
(OCN)$_2$MeSi(CH$_2$)$_2$(CF$_2$)$_n$(CH$_2$)$_2$—SiMe(NCO)$_2$

The perfluorinated group-containing silane compound may also be a condensate which is obtained by hydrolyzing one of such compounds, or a silane compound wherein the perfluoroalkyl group has an ether bond. Further, two or more of the above perfluor-inated group-containing silane compounds may be suitably selected for use as a co-condensate. Further, to the above perfluorinated group-containing silane compound, other silane compounds may be added for use in the form of mixtures.

Particularly preferred is, for example, cold setting Rf(CH$_2$)$_2$SiCl$_3$ or Rf(CH$_2$)$_2$Si(NCO)$_3$. Namely, while an alkoxysilane undergoes dehydration condensation by heating to form a firm siloxane bond, a chlorosilane or an isocyanate silane is capable of firmly bonding to a hydroxyl group present at the surface of e.g. glass at room temperature, whereby no heating process is required, and it is easy and suitable for industrial application.

The concentration of the effective component in the water-repellent fluid, will be determined taking into consideration e.g. the operation efficiency for forming a water-repellent film, the stability, the thickness of the water-repellent film and the economical efficiency. It is particularly preferably from 0.2 to 12 wt %, as calculated as the solid content of the effective component, based on the total amount of the water-repellent fluid. If the concentration is less than 0.2 wt %, no adequate water-repellent performance tends to be obtained, and if it exceeds 12 wt %, the water-repellent fluid tends to remain too much on the substrate surface, whereby it will take a long time for subsequent wiping it off, and the amount of the water-repellent fluid to be wiped off will be substantial, such being industrially disadvantageous.

In the present invention, the organic solvent to be contained in the water-repellent fluid may, for example, be an acetic acid ester, an aromatic hydrocarbon, a halogenated hydrocarbon, a ketone or an ether. However, when a compound having an isocyanate group, such as Rf(CH$_2$)$_2$Si (NCO)$_3$, is used as the effective component, an organic solvent having a reactive functional group (such as a hydroxyl group) is not desirable, since it reacts with the isocyanate group. An organic solvent having a functional group with a low reactivity, such as isopropyl alcohol (IPA), may be employed. The organic solvent is not limited to one type, and two or more solvents may be used in combination as a mixture.

When a hydrocarbon solvent is used, cissing may sometimes occur immediately after coating the water-repellent fluid, since a water-repellent film formed by the reaction of the fluorinated compound (the effective compound) to the substrate surface is likely to repel the water-repellent fluid which has not yet been dried. In such a case, the concentration of the water-repellent fluid and the evaporation rate of the solvent should be adjusted so that the thickness of the water-repellent film at the repelled portion will be at least a monomolecular layer. Further, in such a case, it is preferred to ensure that the irregularity in film thickness due to cissing is not more than 3 μm.

From such a viewpoint, when Rf(CH$_2$)$_2$Si(NCO)$_3$ is used as the effective component, an acetic acid ester type solvent is preferred as the organic solvent. Specifically, butyl acetate or ethyl acetate is preferred.

Further, when a fluorine type solvent is used, it is possible to avoid cissing during coating by adjusting the evaporation rate, whereby a smooth flat dried water-repellent film can be formed.

The film thickness at the time of coating the water-repellent fluid is preferably at least 1 μm at the thinnest portion and at most 10 μm at the thickest portion. Further, it is preferably coated uniformly in a thickness of about 3 μm over the entire surface of the substrate to be coated. If the thickness is less than 1 μm, no adequate water-repellent performance tends to be obtained, and if it exceeds 10 μm, it tends to take a long time to wipe the excess amount off. If irregularities in film thickness of more than 3 μm exist in the substrate surface to be coated, non-uniformity is likely to result in the subsequent wiping, whereby it tends to be difficult to attain uniform wiping over the surface.

As means for coating the water-repellent fluid, various conventional methods such as dip coating, spin coating, spray coating, curtain (flow) coating, die head coating, blade coating, wipe coating and squeegee coating, may, for example, be mentioned. The squeegee coating is particularly preferred, since it is thereby possible to carry out coating readily in a short period of time on a substrate with a large surface area with a small amount of fluid and only on one side of the substrate having curved surfaces without masking, or a cold setting water-repellent fluid can be continuously supplied to the substrate without deterioration of the water-repellent fluid, and even if the water-repellent fluid is expensive, treatment can be carried out at low cost with the minimum amount of fluid required.

To secure the coating thickness of the water-repellent fluid, it is preferred to use an elastic body, particularly a plate-shaped elastic body. Namely, it is preferred that in the coating step, the water-repellent fluid is dropped on the substrate surface and then spread-coated over the substrate surface by an elastic body. The material for the elastic body may, for example, be a rubber, a foam or a cloth. A foam is preferred, since it absorbs the water-repellent fluid to some extent, whereby the fluid can readily be uniformly spread. Specifically, a sponge squeegee is preferred. If a foam such as a sponge squeegee is employed, even if the substrate surface to be coated has a curvature with a curvature radius of at most 1,000 mm, the foam can follow the curvature. Further, in a case where the curvature radius is small, it is possible to let the squeegee itself have a curvature.

The foam should be durable against the water-repellent fluid and preferably has open cells (whereby absorption of the fluid will be excellent) and is flat and smooth. The material is preferably polyurethane or polyethylene. When butyl acetate is used as the solvent, it is preferred to employ a polyethylene foam.

Figure 5:
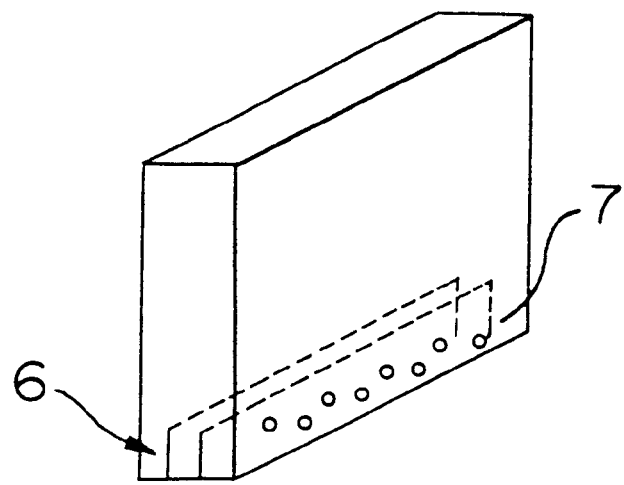
FIG. 5($a$) is a perspective view showing an example of a sponge squeegee used in the present invention.
Figure 5:
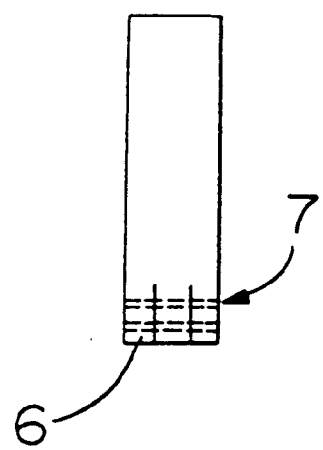

Even a closed cell sponge may be used for coating without any particular problem by providing slits and/or perforations at its forward end to facilitate absorption of the water-repellent fluid. As a specific example, as shown in FIG. 5, a few slits (notches) 6 of from 1 to 15 mm may be imparted in a direction of height from the lower surface of a squeegee or perforations 7 (preferably through-holes) of from about 0.1 to 1 mm may be provided in a thickness direction (in a coating direction) at a lower portion of a squeegee, to let the sponge absorb the fluid by capillary action. Slits 6 are preferably imparted in a direction parallel to the length direction (in a direction perpendicular to the coating direction). Perforations 7 are preferably provided in a zigzag fashion in parallel to one another at from about 3 to 5 mm from the lower end of the squeegee.

So long as no irregularities in thickness after coating will result, there is no particular restriction as to the number, the size or the design of the slits 6 or the perforations 7.

The reaction of the water-repellent fluid with the substrate surface after coating the water-repellent fluid, is carried out usually by drying. The drying time is preferably from one minute to 75 hours. If it is less than one minute, the evaporation and drying of the diluting solvent tends to be inadequate, and no adequate bonding reaction of the water-repellent fluid to the substrate can be attained. On the other hand, if it exceeds 75 hours, the reaction of the water-repellent fluid tends to proceed too much, whereby the subsequent wiping tends to be difficult. Especially when a cold setting water-repellent fluid is used, the drying time is preferably from 1 to 25 hours.

The temperature for drying after coating the water-repellent fluid is preferably from room temperature to 300° C. If it is lower than room temperature, the reaction for bonding to the substrate will not proceed adequately, and it takes a long time for the reaction. If it exceeds 300° C., the water-repellent fluid tends to gradually decompose, whereby the water repellency will decrease. Especially when a cold setting water-repellent fluid is used, the temperature is preferably from room temperature to 200° C.

Removal (wiping off) of the excess amount is carried out until color shading disappears and transparency of the substrate such as glass itself can be secured. To obtain water repellency, the film thickness may theoretically be at least a monomolecular layer. Taking into consideration the durability of the water-repellent film and the economical effects in addition thereto, the film thickness is preferably at most 2 $\mu$m. For example in a case where a thermosetting water-repellent fluid is used, the film thickness after wiping off the water-repellent fluid is preferably from 5 to 60 nm, and in a case where a cold setting water-repellent fluid is used, it is preferably from 5 to 60 nm.

For the removal (wiping off) of the excess amount, it is preferred to employ a paper, a cloth (such as breached cotton or a towel), a fine porous silica powder, or a powder of e.g. foamed polyethylene, starch or cellulose. It is particularly preferred that a powder capable of adsorbing the excess amount of the water-repellent fluid, is sprinkled on the surface coated with the water-repellent fluid, and then this powder is removed to remove the excess amount of the water-repellent fluid. The particle size of the powder is not particularly limited, and for example, one having a particle size of about a few tens $\mu$m may be employed. Also, the shape of the powder is not particularly limited. The removal of the powder is preferably carried out by means of a brush, a cloth or the like.

If it is attempted to wipe off the water-repellent fluid solely by a brush of e.g. PVC (a vinyl chloride resin), the excess water-repellent fluid will merely be kneaded on the substrate and can not be removed. Whereas, if removed by a brush by means of a powder which by itself has an adsorbing ability, the water-repellent fluid will be removed as adsorbed on the adsorptive powder, whereby the brush will not be soiled with the water-repellent fluid, and by supplying the adsorptive powder afresh, the water-repellent fluid which is in a large excess can continuously be removed. It is particularly preferred to employ a powder containing starch and/or cellulose, since the efficiency for wiping off is high, and it is safe and inexpensive.

The material of the brush is not particularly limited, but PVC is preferred from the viewpoint of physical strength and unlikeliness to be electrified. Bristles of the brush preferably have a diameter of from 0.1 to 0.5 mm, more preferably about 0.2 mm. If the diameter is less than 0.1 mm, the physical force to remove the powder will be weak, and if it exceeds 0.5 mm, the bristles tend to be too hard. Further, the bristles of the brush preferably have a length of from 20 to 50 mm, more preferably about 40 mm. If the length is less than 20 mm, their following property tends to be poor, and if the length exceeds 50 mm, the bristles tend to scatter the powder.

As another method for removing (wiping off) the excess amount, a method is preferred wherein the excess amount of the water-repellent fluid is dissolved and removed by a solvent which is capable of dissolving the excess amount of the water-repellent fluid. Namely, as compared with mechanical wiping off, the chemical wiping off by dissolving only the unreacted water-repellent fluid may sometimes be easy in finishing a smooth and uniform surface with the high fluorine concentration. Specifically, by wiping (rubbing) the coated surface with a paper, a cloth or a foam having a solvent capable of dissolving the excess amount of the water-repellent fluid impregnated, the excess amount is dissolved and absorbed by the paper, cloth or foam. By this removal (wiping off) method, there will be no scattering of e.g. the powder, and the cost is low.

As such a solvent, a solvent such as an aliphatic hydrocarbon, an aromatic hydrocarbon, a halogenated hydrocarbon, an alcohol, a ketone, an ester, an alcohol ester, a ketone ester, an ether, a ketone alcohol, an ether alcohol, a ketone ether, an ester ether or a fluorinated hydrocarbon, may be employed. Particularly preferred is a lower alcohol.

Further, IPA is preferred from the viewpoint of the safety and cost in addition to the solubility to the water-repellent fluid and the optimum drying rate at the time of wiping off.

Now, the present invention will be described in further detail with reference to Examples. However, it should be understood that the present invention is by no means restricted to such specific Examples.

EXAMPLE 1

A water-repellent thin film was formed on a front door glass having a curvature with a curvature radius of 1,000 mm in the height direction, as follows.

A water-repellent fluid containing 4 wt % (as the solid content concentration of the effective component) of fluoroalkylsilyl isocyanate ($C_8F_{17}C_2H_4Si(NCO)_3$) as an effective component in a perfluoro(2-n-butyltetrahydrofuran) solution (boiling point: 100° C., specific gravity: 1.77, was dropped on a glass surface and then spread-coated with a foamed polyurethane plate-shaped sponge squeegee by pressing the sponge squeegee on the glass surface.

Figure 2:
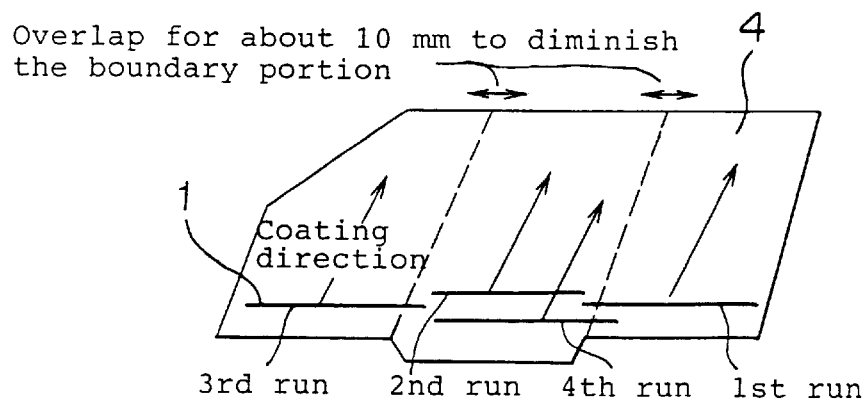
FIG. 2 is a plan view showing the loci of the squeegee in the coating step of Example 1.

FIG. 1 is a side view showing the state of the squeegee during coating of the water-repellent fluid. Reference numeral 1 represents a squeegee, numeral 2 a holder, numeral 3 a water-repellent fluid and numeral 4 the substrate (glass). FIG. 2 is a plan view showing the loci of the squeegee in the coating step. The length of the squeegee was 300 mm. For coating over a width exceeding the length of the squeegee, the squeegee was run repeatedly with an overlap of from 10 to 20 mm. If the water-repellent fluid (ink) still remained too much at the overlapped portion (the boundary portion), the squeegee was run once again without supplying the ink, to reduce the excessive ink.

As shown in FIG. 2, in this Example, the water-repellent coating fluid was spread-coated over the entire glass by coating four times. Supply of the water-repellent coating fluid was carried out by a nozzle disposed in front of the squeegee. Except for 10 mm from each end of the squeegee, the amount of the fluid was controlled within a range of from 0.5 to 5 cc so that the fluid would not overflow from the squeegee.

In the above coating of the water-repellent fluid by a sponge squeegee, the amount of the ink was controlled to be minimum so that there was no overflow of the fluid from the squeegee (no standing ink), whereby it was possible to spread the water-repellent coating fluid over the entire glass by three coating operations.

After coating as described above and drying at 25° C. for 60 minutes, as an excess amount-removing step, a powder of starch (particle size: a few tens nm) was sprinkled on the surface coated with the water-repellent fluid, and then the powder was removed by a rotary brush of 200 mm in diameter (made of PVC, length of bristles: 40 nm, thickness of bristles: 0.2 mm). If the rotation is too fast, the powder in the advancing direction of the brush will be scattered around, whereby the finishing performance will be poor. Therefore, the rotational speed of the brush was controlled to be not higher than 200 rpm, and the brush was rotated within a rotational speed of from 50 to 200 rpm depending upon the degree of the removal. To lead the powder to the center of the brush, the brush was inclined at an angle of from about 5 to 10° to the advancing direction of the brush, and the brush was run in a state that it was pressed down for from 5 to 15 mm on the glass.

Figure 3:
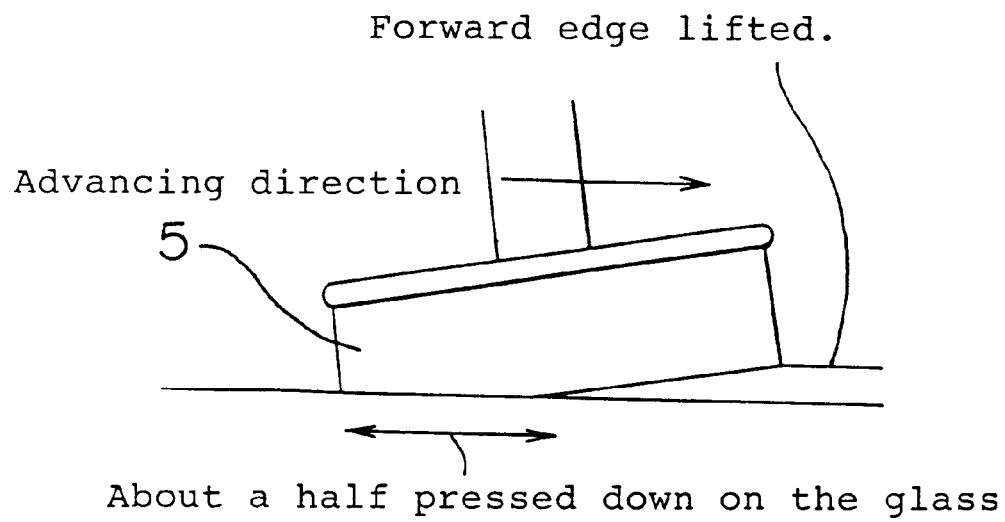
FIG. 3 is a side view showing the state of a brush in the excess amount-removing step of Example 1
Figure 4:
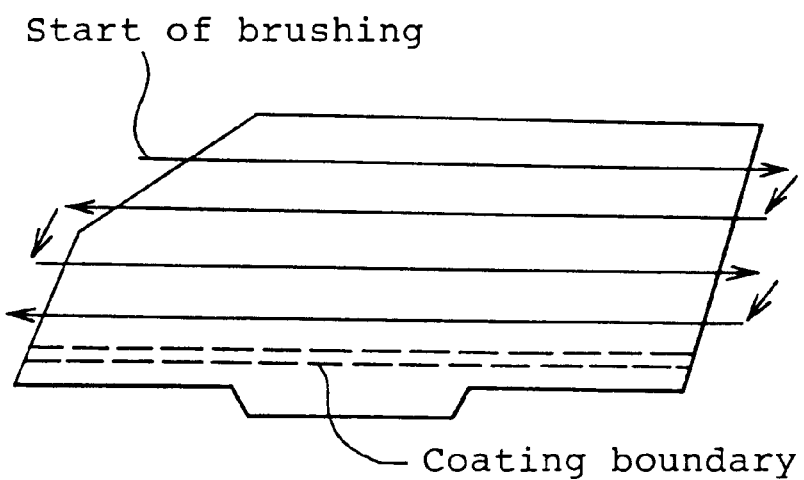
FIG. 4 is a plan view showing the loci of the brush in the excess amount-removing step of Example 1

FIG. 3 is a side view showing the state of the brush in the excess amount-removing step. Reference numeral 5 represents a brush. FIG. 4 is a plan view showing the loci of the brush in the excess amount-removing step. As described in the foregoing, a transparent uniform water-repellent film was formed. The film thickness was from 10 to 30 nm.

The foamed polyurethane plate-shaped sponge squeegee used in this Example, absorbed the water-repellent fluid well. Accordingly, even when supply of the fluid was varied, it was possible to carry out the coating relatively uniformly, and even at the glass edge portion, it was possible to carry out coating uniformly.

EXAMPLE 2

A water-repellent coating fluid was spread-coated on a front door glass and dried in the same manner as in Example 1 except that a water-repellent fluid containing 7 wt % (as the solid content concentration of the active component) of fluoroalkylsilyl isocyanate ($C_8F_{17}C_2H_4Si(NCO)_3$) as an effective component in a n-butyl acetate solution (boiling point: 126° C., specific gravity: 0.87), was used, and a foamed polyethylene plate-shaped sponge squeegee was used. As an excess amount-removing step, instead of the method of using a powder of starch in Example 1, the "excess amount" of the water-repellent fluid was wiped off by wiping a few times with a towel impregnated with IPA. Here, impregnation of IPA was carried out by spraying it on the towel by a sprayer. By this impregnation method, IPA was uniformly impregnated into the towel. The impregnated amount was about from 1 to 3 cc per 30 cm$^2$ of the towel. As a result of the wiping off of the "excess amount" of the water-repellent fluid, a transparent uniform water-repellent film was formed. The film thickness was from 10 to 30 nm. Further, the operation efficiency was good.

The foamed polyethylene plate-shaped sponge squeegee used in this Example had a small absorption of the water-repellent fluid. As a result, the amount of the water-repellent fluid used was small. Accordingly, the "excess amount" was small, whereby the wiping was carried out in a short period of time.

Heretofore, the coating step and the wiping step (finishing) have been carried out by manual operation simultaneously, whereby a skill is required, and non-uniformity in e.g. the amount of the water-repellent fluid, the number of coating operations, the coating force, the frequency for changing paper or the like, etc., was unavoidable. Whereas, in the present invention, the coating step and the wiping-off step are separated, and a predetermined amount is coated, and a predetermined excess amount is removed, whereby each step can be automated (by a robot), whereby mass production has been made possible by mechanization, and it has been made possible to form a high quality water-repellent thin film in a large quantity constantly. The quality has been made consistent, and the treating time per sheet has been substantially shortened to such an extent that it is about 5 minutes while it took from 15 to 20 minutes by the conventional manual operation.

What is claimed is:

1. A process for forming a water-repellent thin film on a substrate surface by means of a coating fluid for forming a water-repellent thin film, which comprises excessively coating a substrate with a coating fluid thereby forming a water-repellent thin film on a substrate surface, then removing said excess amount of the coating fluid by dissolving it in a lower alcohol and forming a film which is 5 to 60 nm thick.

2. The process for forming a water-repellent thin film according to claim 1, wherein in the coating step, the coating fluid for forming a water-repellent thin film is dropped on the substrate surface and then spread-coated over the substrate surface by an elastic body.

* * * * *